Oct. 30, 1956  R. W. HENKE  2,768,522
WATER METER TEST STAND
Filed Jan. 27, 1954
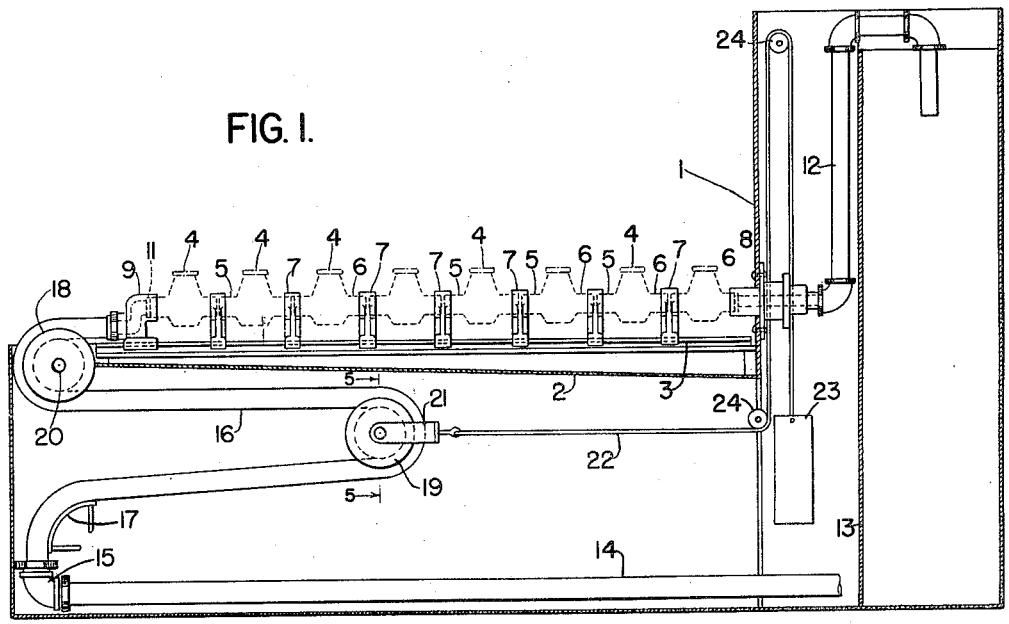
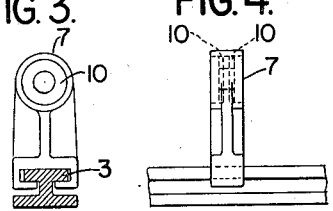
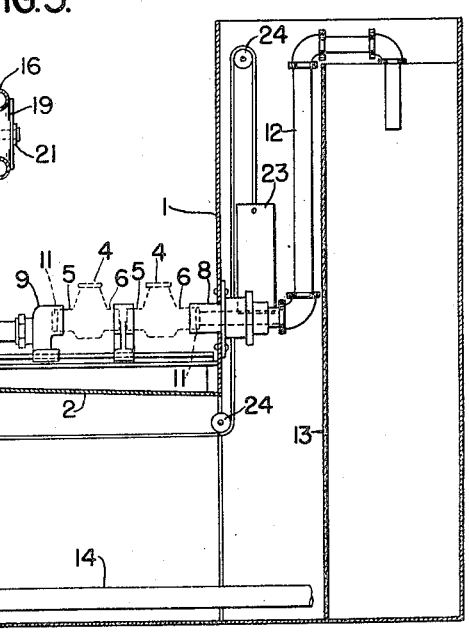
*INVENTOR.*
RUSSELL W. HENKE
BY
*Andrus & Scales*
ATTORNEYS United States Patent Office 2,768,522
Patented Oct. 30, 1956

2,768,522

WATER METER TEST STAND

Russell Warren Henke, Milwaukee, Wis., assignor to Badger Meter Mfg. Company, Milwaukee, Wis., a corporation of Wisconsin Application January 27, 1954, Serial No. 406,552

2 Claims. (Cl. 73—3)

This invention relates to water meter test stands for determining the accuracy of an assembled series of meters and particularly to providing for the supply of water to the movable end clamp member.

The invention provides a hose of adequate size to provide the desired test-flow and relatively movable wheels supporting the hose to maintain the hose against kinking as when under pressure and with two reverse bends allowing movement of said clamps.

An object of the invention is to support the hose properly at all times and prevent the possibility of restricting the flow of water through the hose.

Another object is to extend the life of the hose by proper draining and by preventing any mishandling of the hose.

The drawings furnished herewith illustrate the best mode of carrying out the invention as presently contemplated and set forth hereinafter.

In the drawings:

Figure 1 is a front elevation of a meter test stand with assembled meters and with the front portion of the stand broken away and sectioned to show the mounting of the hose, the suspension of the weight and the tank into which the water is drawn;

Fig. 2 is a view similar to Figure 1 showing a fewer number of meters assembled on the meter test stand;

Fig. 3 is an enlarged elevation of one of the meter supports;

Fig. 4 is an enlarged side elevation of one of the meter supports; and

Fig. 5 is a section taken on line 5—5 of Fig. 1.

The cabinet 1 of the meter test stand shown in the drawings includes the top 2 which may be slightly inclined for draining at one end and the horizontal track or guide 3 supported thereon.

The test stand is adapted to support varying numbers of meters at different times as shown. Each meter 4 includes an inlet 5 and outlet 6 in the form of oppositely projecting pipe connections by which the meter is supported above track 3 by the supports 7 and clamps 8 and 9.

The length of the track 3 and number of supports 7 determines the number of meters which may be tested in series at one time by passing a given, measured quantity of water therethrough.

The upper end of each support 7 is provided with a through-passage for the flow of water and opposite recesses fitted with the gaskets 10.

Similar gaskets 11 are fitted in corresponding recesses of clamps 8 and 9. In setting up a group of meters 4, the head clamp 8 at one end of track 3, is moved to a retracted position and the outlet 6 of a meter is located in the recess to engage the gasket 11 therein while a support 7 is moved on track 3 to receive the inlet 5 of the meter. As many other meters as desired are arranged thus in series and the clamp 9 is then moved up on track 3 to support the inlet 5 of the last meter to be assembled.

After securing clamp 9 on track 3 by suitable means, not shown, the clamp 8 is then actuated to tighten the series of meters 4 between the supports 7 and the corresponding gaskets 10 and 11.

In testing the meters, water is supplied to clamp 9 under pressure and after passing through the entire series of meters to clamp 8 is dumped by the pipe 12 into the tank 13 adjacent one end of cabinet 1 until the tank is filled to a predetermined height and known capacity. The comparison of the subsequent readings of the meters and the known amount of water in the tank establishes the accuracy of the meters for a given rate of flow which may be established by various means, not shown.

The delivery of water to end clamp 9 is provided by the supply pipe 14 which enters the cabinet 1 in front of tank 13 and is connected by the fitting 15 to the lower end of the hose 16 at the opposite end of the cabinet. Hose 16 is supported at the end referred to by the arcuate plate 17 fixed within cabinet 1 and which maintains a minimum radius of the hose. The opposite end of the hose 16 extending through a suitable opening in cabinet 1 is secured to clamp 9.

According to the invention, the hose 16 is supported intermediate its ends by the fixed guide wheel 18 and movable guide wheel 19. Each wheel is provided with flanges forming a groove of semi-circular section corresponding to the outer dimensions of hose 16.

Wheel 18 is mounted for rotation on the shaft 20 fixed within cabinet 1 and projects through the top of the cabinet so that hose 16 extends horizontally from wheel 18 to clamp 9. The intermediate portion of hose 16 extends over wheel 19 which is positioned within the cabinet to support the hose while allowing the movement of clamp 10 described. The yoke 21 and cable 22 connect wheel 19 and the weight 23 which is suspended adjacent to tank 13. Suitable pulleys 24 guide cable 21 so that the force of weight 23 biases wheel 19 in a direction toward tank 13 and away from plate 17 and wheel 18 to maintain a positive support of the hose while allowing the hose to follow clamp 10 in one direction or to withdraw the hose into the cabinet as the clamp is moved in the other direction.

The hose 16 may be arranged to be always supported by wheels 18 and 19 and plate 17 with a slight downward pitch so that by opening suitable drain means, not shown, in pipe 14, the water will drain from the hose.

The hose is always supported by wheels 18 and 19 with two reverse bends of a given minimum radius, preventing kinking of the hose which is particularly damaging since the hose must be capable of withstanding the maximum pressure to which the meters must be subjected for testing purposes.

Various modes of carrying out the invention are contemplated as within the scope of the following claims particularly pointing out and distinctly claims the subject matter which is regarded as the invention.

I claim:

1. A water meter test stand comprising a cabinet having an upright measuring tank at one end, a track extending lengthwise of said cabinet and adapted to support a selected number of meters disposed in series and in alignment for testing, a conduit carried by the cabinet and adapted to connect with the outlet of the last meter of the series at the end of said cabinet adjacent said tank and to discharge water from the meter into said measuring tank, a water supply conduit having a hose connector disposed at the opposite end of the cabinet from said connection between said first conduit and said last meter, said track being at a height substantially above the floor level for said cabinet for convenience in installing the meters for test and said last-named conduit having its hose connection near the floor of the cabinet, an end clamp adjustably mounted upon said track and adapted to connect with the inlet for the first meter of the series, a flexible hose secured to said water supply conduit connection and to said end clamp to supply water to said meters for test purposes, a sheave rotatably carried at the end of said track to support the hose as it approches said end clamp, a second sheave in tensioning engagement with the portion of said hose between said water supply conduit connection and said first-named sheave to take up any slack in said hose caused by adjustment of said end clamp to accommodate more meters, and means to bias said second sheave in a direction toward the upright tank end of said cabinet to maintain the hose tensioned and free of kinks.

2. A water meter test stand comprising a cabinet having an upright measuring tank at one end, a track extending lengthwise of said cabinet and adapted to support a selected number of meters disposed in series and in alignment for testing, a conduit carried by the cabinet and adapted to connect with the outlet of the first meter of the series at the end of said cabinet adjacent said tank and to discharge water from the meter into said measuring tank, a water supply conduit having a hose connector disposed at the opposite end of the cabinet from said connection between said first conduit and said last meter, said track being at a height substantially above the floor level for said cabinet for convenience in installing the meters for test and said last-named conduit having its hose connection near the floor of the cabinet, an end clamp adjustably mounted upon said track and adapted to connect with the inlet for the first meter of the series, a flexible hose secured to said water supply conduit connection and to said end clamp to supply water to said meters for test purposes, a sheave rotatably carried at the end of said track to support the hose as it approches said end clamp, a second sheave in tensioning engagement with the portion of said hose between said water supply conduit connection and said first-named sheave to take up any slack in said hose caused by adjustment of said end clamp to accommodate more meters, a pulley block carrying said second sheave and extending around said hose, a cable secured to said pulley block and extending over idler pulleys in the upright portion of the cabinet adjacent said tank, and a weight suspended from the free end of the cable within said upright portion of the cabinet and adapted to raise and lower depending upon adjustment of said end clamp along the track to accommodate fewer or more meters for a given test operation, said weight maintaining a given tensioning of the hose and preventing kinking of the same.

References Cited in the file of this patent

UNITED STATES PATENTS

| | | |
|---|---|---|
| 1,328,448 | Pieper | Jan. 20, 1920 |
| 1,462,718 | Mueller | July 24, 1923 |
| 1,793,469 | Drake | Feb. 24, 1931 |
| 2,631,451 | Ford et al. | Mar. 17, 1953 |